US010915559B2

(12) United States Patent
Kataoka et al.

(10) Patent No.: US 10,915,559 B2
(45) Date of Patent: Feb. 9, 2021

(54) DATA GENERATION METHOD, INFORMATION PROCESSING DEVICE, AND RECORDING MEDIUM

(71) Applicant: FUJITSU LIMITED, Kawasaki (JP)

(72) Inventors: Masahiro Kataoka, Kamakura (JP); Takahiro Okubo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 16/171,099

(22) Filed: Oct. 25, 2018

(65) Prior Publication Data

US 2019/0130022 A1 May 2, 2019

(30) Foreign Application Priority Data

Oct. 31, 2017 (JP) .................. 2017-211127

(51) Int. Cl.
*G06F 16/31* (2019.01)
*G06F 40/123* (2020.01)
*G06F 40/279* (2020.01)

(52) U.S. Cl.
CPC .......... *G06F 16/313* (2019.01); *G06F 40/123* (2020.01); *G06F 40/279* (2020.01)

(58) Field of Classification Search
CPC ...... G06F 40/253; G06F 16/334; G06F 16/313
See application file for complete search history.

(56) References Cited

U.S. PATENT DOCUMENTS 9,600,469 B2 * 3/2017 Kim ................. G06F 40/253
2005/0203900 A1 * 9/2005 Nakamura .......... G06F 16/334
2016/0056839 A1 2/2016 Kataoka et al.

FOREIGN PATENT DOCUMENTS

JP 2016-046602 4/2016

* cited by examiner

*Primary Examiner* — Etienne P Leroux
(74) *Attorney, Agent, or Firm* — Fujitsu Patent Center

(57) ABSTRACT

A non-transitory computer-readable recording medium stores therein a data generation program that causes a computer to execute a process including: referring to each index in which a morpheme, which is generated from text data and which is included in the text data, is associated to position of the morpheme in the text data; and arranging, in sequence of positions in the text data, morphemes associated in the indexes.

5 Claims, 11 Drawing Sheets

FIG.3
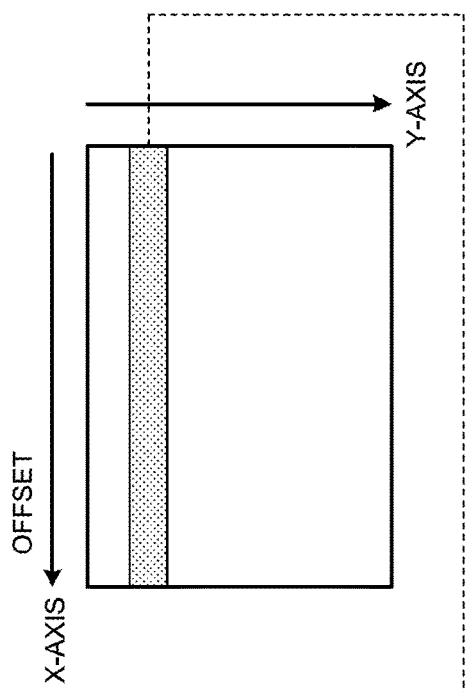
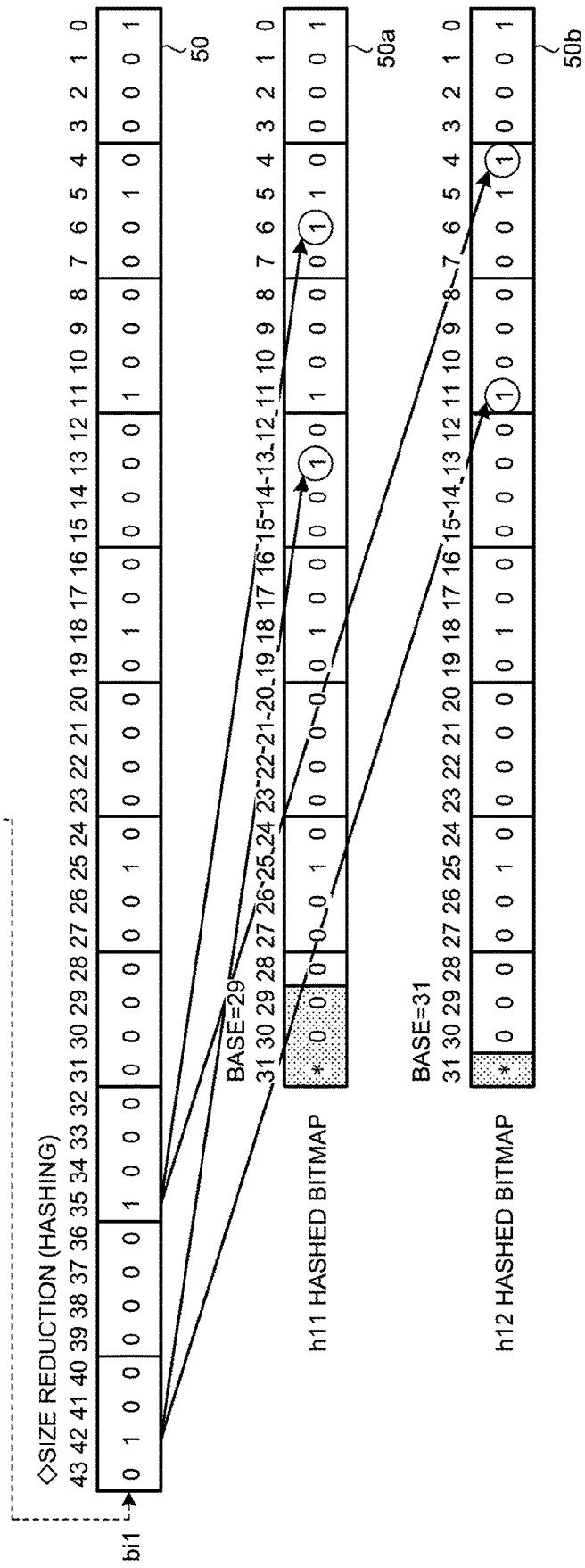

FIG.4

| | 0*h | 1*h | 2*h | 3*h | 4*h | 5*h | 6*h | 7*h |
|---|---|---|---|---|---|---|---|---|
| *0h | NUL | DLE | | | | | HIGH-FRE-QUENCY WORD | HIGH-FRE-QUENCY WORD |
| *1h | SOH | DC1 | | | | | | |
| *2h | STX | DC2 | | | | | | |
| *3h | ETX | DC3 | | | | | | |
| *4h | EOT | DC4 | | | | | | |
| *5h | ENQ | NAK | | | | | | |
| *6h | ACK | SYN | | | | | | |
| *7h | BEL | ETB | | | | | | |
| *8h | BS | CAN | | | | | | |
| *9h | HT | EM | | | | | | |
| *Ah | LF/NL | SUB/EOF | | | | | | |
| *Bh | VT | ESC | | | | | | |
| *Ch | FF/NP | FS | | | | | | |
| *Dh | CR | GS | | | | | | |
| *Eh | SO | RS | | | | | | |
| *Fh | SI | US | | | | | | |

| | CONTROL CODE (1 BYTE) | EXTREMELY-HIGH-FREQUENCY WORD (ENGLISH) (1 BYTE: 32 WORDS) | EXTREMELY-HIGH-FREQUENCY WORD (JAPANESE) (1 BYTE: 32 WORDS) | HIGH-FREQUENCY WORD (ENGLISH) (2 BYTES: 8k WORDS) |

| | 8*h | 9*h | A*h | B*h | C*h | D*h | E*h | F*h |
|---|---|---|---|---|---|---|---|---|
| *0h | HIGH-FRE-QUENCY WORD | HIGH-FRE-QUENCY WORD | LOW-FRE-QUENCY WORD (DYNAMIC COMMON) 2 BYTES | LOW-FRE-QUENCY WORD (DYNAMIC COMMON) | LOW-FRE-QUENCY WORD (DYNAMIC COMMON) | LOW-FRE-QUENCY WORD (DYNAMIC COMMON) | LOW-FRE-QUENCY WORD (DYNAMIC COMMON) | LOW-FRE-QUENCY WORD (DYNAMIC INDIVIDUAL) |
| *1h | | | | | | | | |
| *2h | | | | | | | | |
| *3h | | | | | | | | |
| *4h | | | | | | | | |
| *5h | | | | | | | | |
| *6h | | | | | | | | |
| *7h | | | | | | | | |
| *8h | | | | | | | | |
| *9h | | | | | | | | |
| *Ah | | | | | | | | |
| *Bh | | | | | | | | |
| *Ch | | | | | | | | |
| *Dh | | | | | | | | |
| *Eh | | | | | | | | |
| *Fh | | | | | | | | |

| HIGH-FREQUENCY WORD (JAPANESE) (2 BYTES: 8k WORDS) | LOW-FREQUENCY WORD (DYNAMIC CODE) (2 BYTES: 16k WORDS) | LOW-FREQUENCY WORD (DYNAMIC CODE) (3 BYTES: 2M WORDS) |

DATA GENERATION METHOD, INFORMATION PROCESSING DEVICE, AND RECORDING MEDIUM

CROSS-REFERENCE TO RELATED APPLICATION

This application is based upon and claims the benefit of priority of the prior Japanese Patent Application No. 2017-211127, filed on Oct. 31, 2017, the entire contents of which are incorporated herein by reference.

FIELD

The embodiments discussed herein are related to a data generation method, an information processing device, and a computer-readable recording medium.

BACKGROUND

As far as data compression and data decompression is concerned, in the LZ77 compression or the ZIP compression, encoding and decoding is performed by assigning codes having a short bit length to characters and longest-match strings. Moreover, a technology is known that, during a web search, enables achieving enhancement in the speed of full-text retrieval using inverted indexes associated to words.

On the other hand, in recent years, a technology is known in which, with the aim of performing compression or decompression, encoding and decoding is performed by assigning codes to words; and, with the aim of achieving enhancement in the search speed, inverted indexes associated to words and to the positions of appearance of the words are generated and incorporated.

Patent Document 1: Japanese Laid-open Patent Publication No. 2016-046602

SUMMARY

According to an aspect of the embodiment, a non-transitory computer-readable recording medium stores therein a data generation program that causes a computer to execute a process including: referring to each index in which a morpheme, which is generated from text data and which is included in the text data, is associated to position of the morpheme in the text data; and arranging, in sequence of positions in the text data, morphemes associated in the indexes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram for explaining about size reduction related to bitmap-type inverted indexes;

FIG. 4 is a diagram for explaining a static dictionary and a dynamic dictionary;

FIG. 5 is a diagram for explaining about the expansion of hashed bitmap-type inverted indexes;

FIG. 6 is a diagram for explaining about the AND operation of the hashed bitmap-type inverted indexes;

DESCRIPTION OF EMBODIMENTS

It is a simple task if the original data is to be restored based on the compression codes associated to the sequence of appearance of the words. However, since indexes are transposed (sorted) not according to the sequence of appearance of the words but according to the sequence of word codes (or the sequence of character codes constituting the words), it is a difficult task to restore the original data.

Moreover, in order to hold down an increase in the size of the inverted indexes, the words having a high frequency of appearance are excluded from the targets for indexing, or the granularity of the information related to the positions of the inverted indexes is increased. For that reason, it is not possible to restore the original data using the inverted indexes.

Preferred embodiments will be explained with reference to accompanying drawings. However, the invention is not limited by the embodiments described below. Moreover, the embodiments can be appropriately combined without causing any contradictions.

[a] First Embodiment

Overall Configuration

Figure 1:
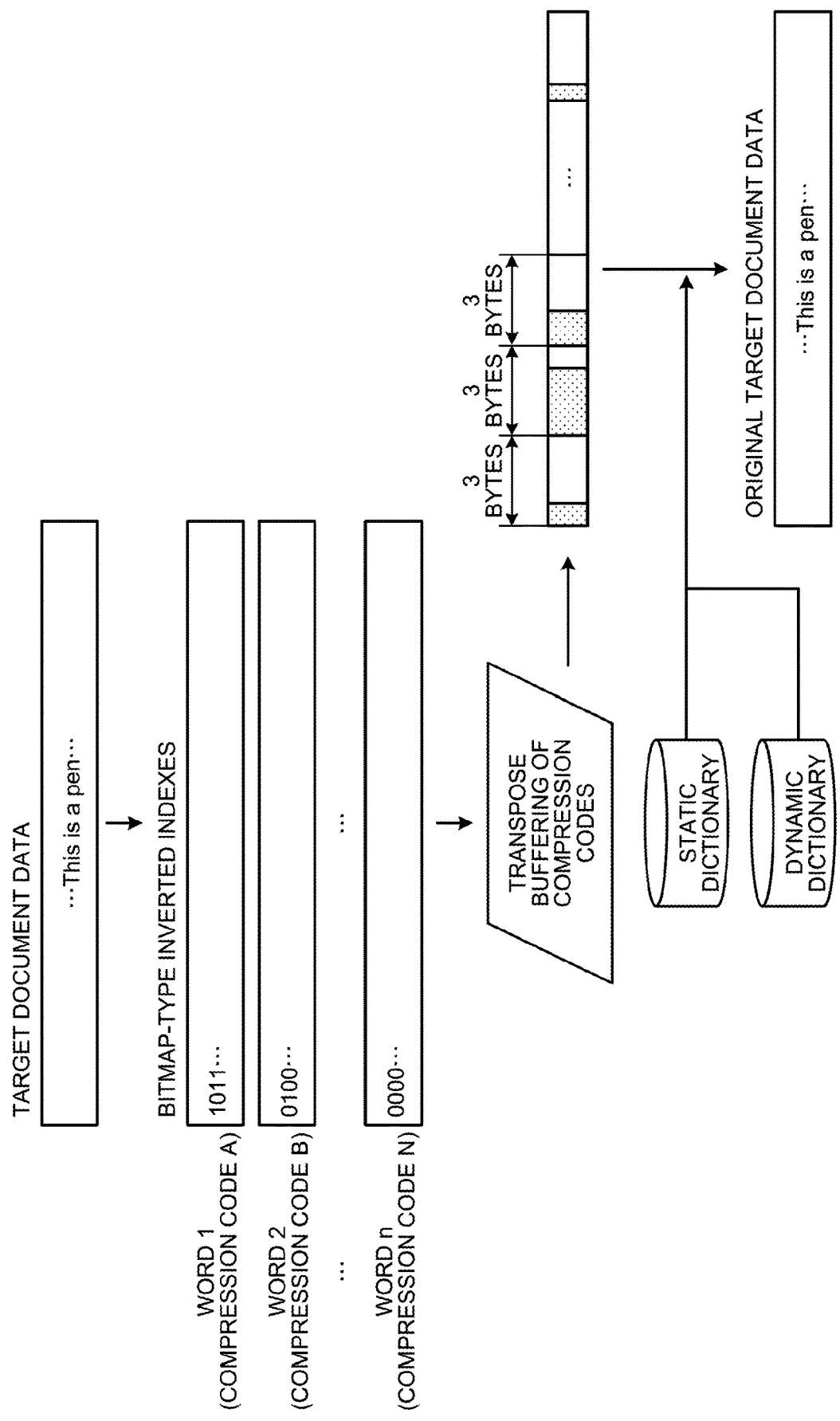
FIG. 1 is a diagram for explaining a restoration operation performed according to a first embodiment.

Firstly, the explanation is given about the operations performed by an information processing device 10 (see FIG. 2) according to a first embodiment. FIG. 1 is a diagram for explaining a restoration operation performed according to the first embodiment. As illustrated in FIG. 1, the information processing device 10 obtains bitmap-type inverted indexes (hereinafter, sometimes simply called bitmaps or hashed bitmaps) corresponding to compression codes; performs transpose buffering of the compression codes using the bitmap-type inverted indexes; and arranges the compression codes in transpose buffers. Subsequently, using a static dictionary and a dynamic dictionary, the information processing device 10 converts the compression codes according to the sequence of their storage in the transpose buffers, and restores the original text data.

A bitmap-type inverted index is an index which is generated from target document data for encoding, and in which the compression code corresponding to a word appearing in the document data is associated to the positions of appearance of that word in the document data. A static dictionary includes the description of the compression codes assigned in advance to the words having a high frequency of appearance, and represents a table in which high-frequency words are associated to compression codes. A dynamic dictionary includes the description of the compression codes assigned to the words having a low frequency of appearance, and represents a table in which low-frequency words are associated to compression codes. That is, from among the words appearing in the document data, regarding each unregistered word that is not registered in the static dictionary, the compression code that is assigned when the unregistered word appears in the document data is stored in a corresponding manner to the unregistered word in the dynamic dictionary. The transpose buffers are partitioned in units of a fixed length of three bytes, and have the same length as the byte count of the bitmap-type inverted indexes.

The information processing device 10 obtains a bitmap-type inverted index corresponding to each of a compression code A, a compression code B, . . . , and a compression code N corresponding to a word 1, a word 2, . . . , and a word n, respectively, appearing in the document data. Then, the information processing device 10 prepares the transpose buffers partitioned in units of three bytes.

According to each bitmap-type inverted index corresponding to the compression code of a word, the information processing device 10 transposes the compression code of each appeared word in the transpose buffers corresponding to the positions of appearance in the target document data. For example, if the word 1 (the compression code A) appears in the first place and in the third place and if the word 2 (the compression code B) appears in the second place; then the compression code A is stored in the first transpose buffer, the compressing coding B is stored in the second transpose buffer, and the compression code A is again stored in the third transpose buffer.

Subsequently, the information processing device 10 refers to the static dictionary and the dynamic dictionary, and converts the stored compression codes to the original words in the sequence of their storage in the transpose buffers. In the example given above, the information processing device 10 converts the compression code A, which is stored in the first transpose buffer, into the word 1; converts the compression code B, which is stored in the second transpose buffer, into the word 2; converts the compression code A, which is stored in the third transpose buffer, into the word 1; and so on and arranges the words "word 1, word 2, word 1, . . . " in the sequence of their storage. With that the original document data can be restored.

In this way, the information processing device 10 refers to the indexes, which are generated from the document data representing text data and in which words included in the document data are held in a corresponding to the positions of those words in the document data; and arranges the words, which are associated in the indexes, according to the sequence of their positions in the document data. Thus, the information processing device 10 can generate the original data from the bitmap-type inverted indexes. Meanwhile, in the embodiments, although the explanation is given about an example of bitmap-type inverted indexes corresponding to the compression codes of words, that is not the only possible case. Alternatively, identical operations can be performed even if the bitmap-type inverted indexes correspond to morphemes or words obtained from the document data. In that case, before storing the data in the transpose buffers, the morphemes or the words are converted into compression codes using the static dictionary and the dynamic dictionary.

Device Configuration

Figure 2:
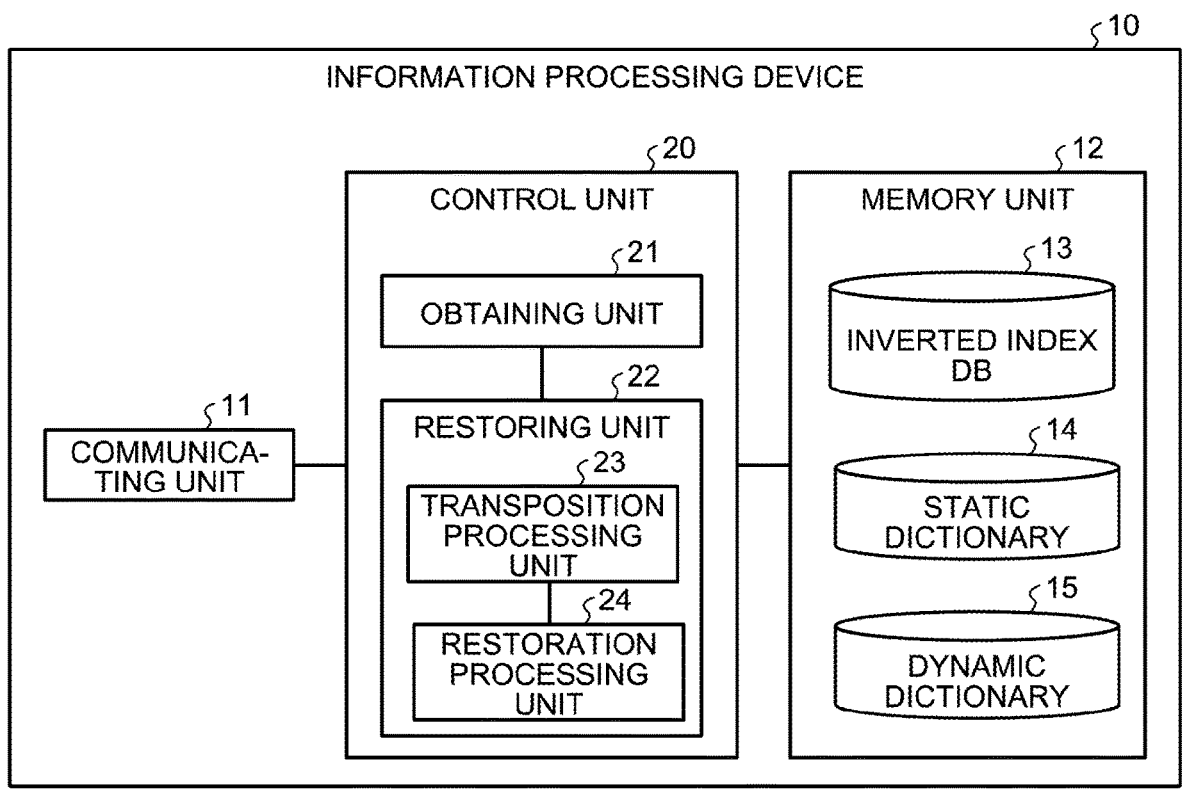
FIG. 2 is a functional block diagram illustrating a functional configuration of an information processing device according to the first embodiment.

FIG. 2 is a functional block diagram illustrating a functional configuration of the information processing device 10 according to the first embodiment. As illustrated in FIG. 2, the information processing device 10 includes a communicating unit 11, a memory unit 12, and a control unit 20.

The communicating unit 11 is a processing unit that controls the communication with other devices and represents, for example, a network interface. For example, the communicating unit 11 receives bitmap-type inverted indexes from another information processing device 10.

The memory unit 12 is an example of a memory device that is used to store computer programs and data, and represents, for example, a memory or a hard disc. The memory unit 12 is used to store an inverted index database (DB) 13, a static dictionary 14, and a dynamic dictionary 15.

The inverted index DB 13 is a database used to store offset-included bitmap-type inverted indexes, which are generated from the target document data for encoding and in which the compression codes corresponding to the words appearing in the document data are associated to the positions of appearance of those words in the document data.

Explained below with reference to FIG. 3 is an example of generating offset-included bitmap-type inverted indexes. FIG. 3 is a diagram for explaining about size reduction related to bitmap-type inverted indexes. Meanwhile, the following explanation is given for an example in which an index generation device that is different than the information processing device 10 generates the bitmap-type inverted indexes. However, alternatively, the information processing device 10 can be configured to generate the bitmap-type inverted indexes.

Explained with reference to FIG. 3 is an example of generating offset-included bitmap-type inverted indexes. As illustrated in FIG. 3, in the operation of generating offset-included bitmap-type inverted indexes, in order to achieve reduction in the size of a bitmap-type index, hashed indexes are generated from the bitmap-type index. That is, in a bitmap-type inverted index, based on a plurality of adjacent hash values (bases), hashed indexes are generated by applying hashing in two dimensions (the word axis and the file axis).

Herein, a bitmap-type index implies a bitmap obtained by indexing the file-by-file presence or absence of the words that are included in text data. As illustrated in FIG. 3, the X-axis of the bitmap-type index represents the offset, and the Y-axis thereof indicates word IDs. That is, the bitmap-type index indicates the presence or absence of the words, which are identified by the word IDs, in a particular file. As an example, a bitmap bi1 is indicated that corresponds to particular word IDs. When the words identified by particular word IDs are present in a file, a binary digit "1" is set regarding the presence or absence of the words in the file. However, when the words identified by particular word IDs are not present in the file, a binary digit "0" is set regarding the presence or absence of the words in the file.

For example, as illustrated in FIG. 3, the index generation device generates a plurality of hashed bitmaps by applying a hash function to the bitmap corresponding to the word IDs. Herein, it is assumed that a 32-bit register is used and, as an example, the index generation device performs hashing of each bitmap based on the hash values (bases) of 29 and 31. More particularly, regarding the hashed bitmap corresponding to a single base, at the position of the remainder that is obtained when the position of each bit of the bitmap corresponding to the word IDs is divided by the base, the index generation device sets the value of the concerned bit of that bitmap.

As an example, regarding a hashed bitmap h11 corresponding to the base 29, at the position of the remainder that is obtained when the position of each bit of the bitmap bi1 is divided by the base 29, the index generation device sets the value of the concerned bit of the bitmap bi1. Thus, the bit value "1" in the 35-th bit of the bitmap bi1 is set at the sixth bit of the hashed bitmap h11. Moreover, the bit value "1" in the 42-nd bit of the bitmap bi1 is set in the 13-th bit of the hashed bitmap h11. Regarding a hashed bitmap h12 corresponding to the base 31, at the position of the remainder that is obtained when the position of each bit of the bitmap bi1 is divided by the base 31, the index generation device sets the value of the concerned bit of the bitmap bi1. Thus, the bit value "1" in the 35-th bit of the bitmap bi1 is set in the fourth bit of the hashed bitmap h12. Moreover, the bit value "1" of the 42-nd bit of the bitmap bi1 is set in the 11-th bit of the hashed bitmap h12. That is, the index generation device sets the bits from the 0-th bit of the bitmap in a sequential manner in the 0-th bit onward of the hashed bitmap until the (base-1)-th bit. Then, returning to the 0-th bit of the hashed bitmap, the index generation device sets the values obtained by performing the OR operation with the values already set in the hashed bitmap.

More specifically, as an example, assume that a bitmap 50 is included in an index, the explanation is given for a case in which the bitmap 50 is subjected to hashing. In that case, from the bitmap 50, the index generation device generates a bitmap 50a corresponding to the base 29 and a bitmap 50b corresponding to the base 31. As against the bitmap 50, the bitmap 50a has a partition set after each offset "29", and the offsets that have the flag "1" set therein and that are positioned after the set partition are expressed using the flags of the offset "0" to the offset "28" of the bitmap 50a.

The index generation device copies the information from the offset "0" to the offset "28" of the bitmap 50 in the bitmap 50a. Moreover, the index generation device processes the information of the offsets from the offset "29" onward of the bitmap 50a in the following manner.

The offset "35" of the bitmap 50 has the flag "1" set therein. Since the offset "35" is equal to the offset "28+7", the index generation device sets the flag "(1)" in the offset "6" of the bitmap 50a. Meanwhile, the first offset is set to "0". The offset "42" of the bitmap 50 has the flag "1" set therein. Since the offset "42" is equal to the offset "28+14", the index generation device sets the flag "(1)" in the offset "13" of the bitmap 50a.

As against the bitmap 50, the bitmap 50b has a partition set at each offset "31", and the offsets that have the flag "1" set therein and that are positioned after the set partition are expressed using the flags of the offset "0" to the offset "30" of the bitmap 50b.

The offset "35" of the bitmap 50 has the flag "1" set therein. Since the offset "35" is equal to the offset "30+5", the index generation device sets the flag "(1)" in the offset "4" of the bitmap 50b. Meanwhile, the first offset is set to "0". The offset "42" of the bitmap 50 has the flag "1" set therein. Since the offset "42" is equal to the offset "30+12", the index generation device sets the flag "(1)" in the offset "11" of the bitmap 50b.

As a result of performing the operations explained above, the index generation device generates the bitmaps 50a and 50b from the bitmap 50. Thus, the bitmaps 50a and 50b represent the result of hashing performed with respect to the bitmap 50. Herein, the explanation is given for a case in which the bitmap has the length of 0 to 43. However, even if the bitmap 50 has the length of 43 or more, the flags "1" set in the bitmap 50 can be expressed using the bitmaps 50a and 50b.

In this way, for each word, the index generation device generates a hashed bitmap in the manner described above. Then, the word-by-word hashed bitmaps are stored in the inverted index DB 13. However, as described above, instead of using bitmap-type inverted indexes of a reduced size, it is also possible to use bitmap-type inverted indexes having the normal size. Meanwhile, as far as the method for size reduction is concerned, any known method can be implemented.

Returning to the explanation with reference to FIG. 2, the static dictionary 14 represents a database for storing the mapping between the words having a high frequency of appearance and the compression codes assigned in advance to those words. The dynamic dictionary 15 represents a database for storing the mapping between the words that have a low frequency of appearance, that are not registered in the static dictionary 14, and that appeared in the target document data for encoding, and the compression codes assigned to those words.

FIG. 4 is a diagram for explaining the static dictionary 14 and the dynamic dictionary 15. The dictionary illustrated in FIG. 4 is formed by combining the static dictionary 14 and the dynamic dictionary 15, and the compression codes and the Y axes of the bitmap-type inverted indexes are associated on a one-to-one basis. In the horizontal axis in FIG. 4, codes "0*h" to "9*h" correspond to the static dictionary 14, and codes "A*h" to "F*h" correspond to the dynamic dictionary 15.

Regarding the items in the horizontal direction in the upper part of FIG. 4, the initial one byte is illustrated in the hexadecimal form using 0 to F, and "*" indicates the second byte. For example, "1*h" indicates that the first byte is "00000001" in the binary form. Regarding the items in the vertical direction in the left-hand side, the second byte is illustrated in the hexadecimal form using 0 to F, and "*" indicates the first byte. For example, "*2h" indicates that the second byte is "00000010" in the binary form.

The code "O*h" as well as the code "1*h" is a 1-byte code and the hierarchies thereof have a common control code associated thereto. Moreover, the code "2*h" as well as the code "3*h" is a 1-byte code, and is associated in advance with an extra-high-frequency word (English word) having a particularly high frequency from among the words appearing at a high frequency. The code "4*h" as well as the code "5*h" is a 1-byte code, and is associated in advance with an extra-high-frequency word (Japanese word) having a particularly high frequency from among the words appearing at a high frequency.

The code "6*h" as well as the code "7*h" is a 2-byte code, and is associated in advance with a word (English word) appearing at a high frequency. The code "8*h" as well as the code "9*h" is a 2-byte code, and is associated in advance with a word (Japanese word) appearing at a high frequency. The code each of "A*h" to "F*h" is a 2-byte code or a 3-byte code, and is dynamically assigned when a low-frequency word appears. Herein, in order to deal with a shortage of codes, the codes "E*h" and "F*h" are set to be 3-byte codes.

The control unit 20 is a processing unit that controls the entire information processing device 10 and represents, for example, a processor. The control unit 20 executes an obtaining unit 21 and a restoring unit 22. Herein, the obtaining unit 21 and the restoring unit 22 either represent examples of the electronic circuits included in the processor or represent examples of the processes executed by the processor.

The obtaining unit 21 is a processing unit that obtains offset-included bitmap-type inverted indexes from another computer such as an index generation device. More particularly, the obtaining unit 21 obtains bitmap-type inverted indexes generated according to the method explained with reference to FIG. 3, and stores the bitmap-type inverted indexes in the inverted index DB 13.

The restoring unit 22 is a processing unit that includes a transposition processing unit 23 and a restoration processing unit 24, and that restores the original document data from the bitmap-type inverted indexes stored in the inverted index DB 13. More particularly, the hashed bitmap-type inverted indexes are restored by the restoring unit 22, and then the original document is restored by the transposition processing unit 23 and the restoration processing unit 24.

Figure 5:
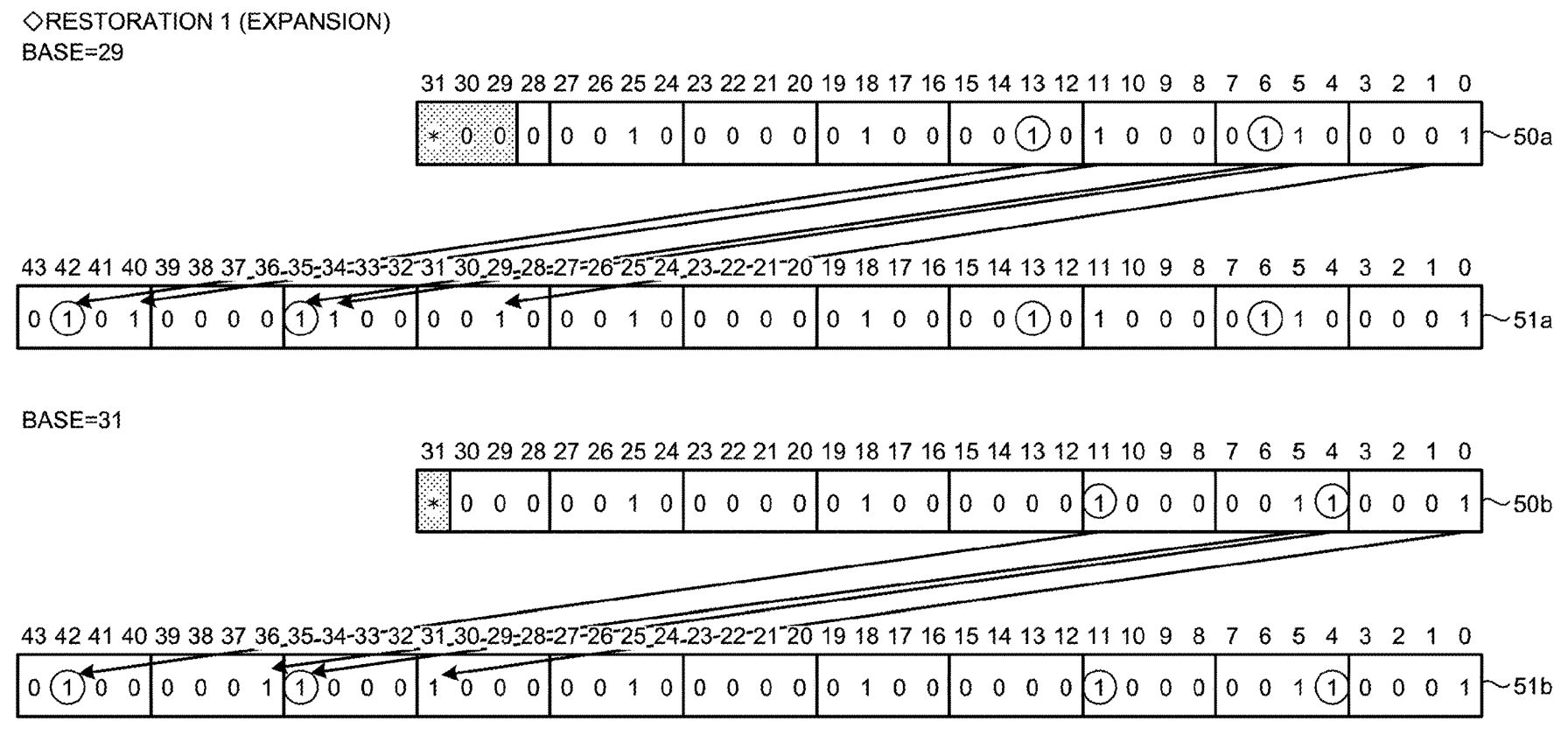
Figure 6:
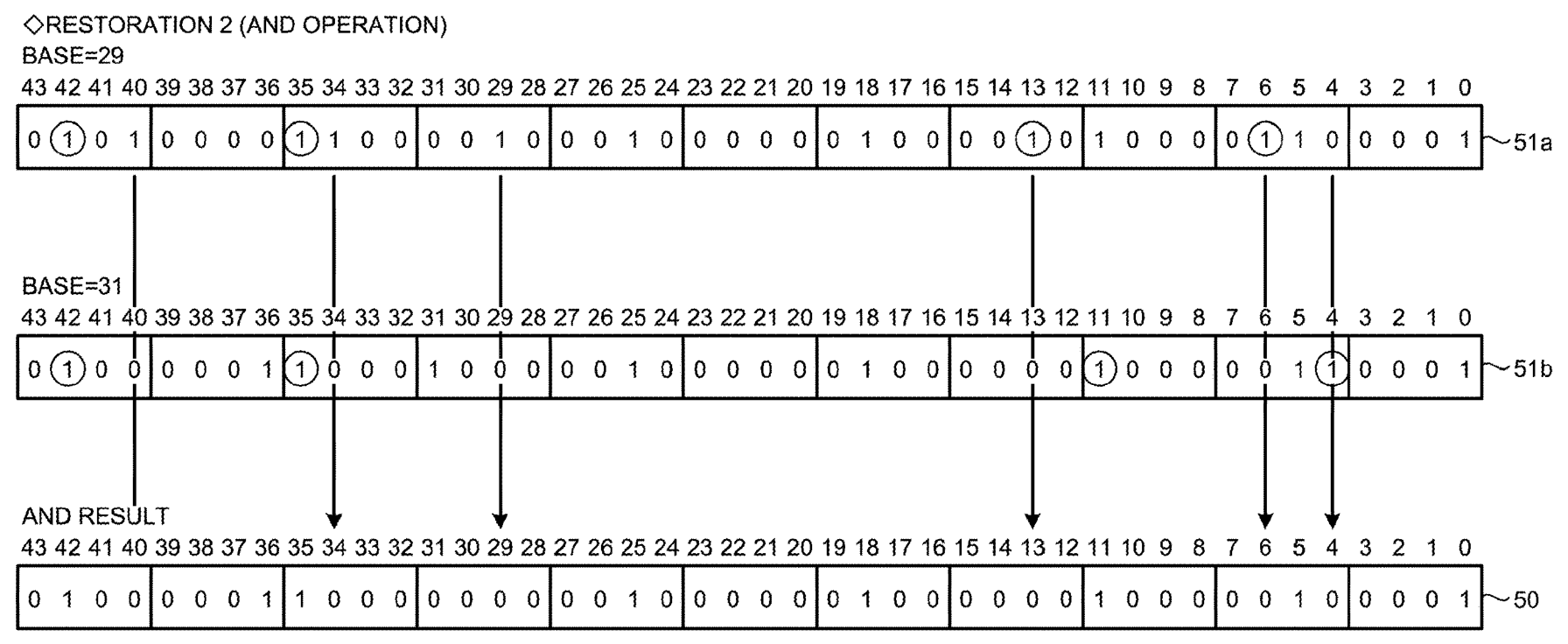

Explained below with reference to FIGS. 5 and 6 is the restoration of hashed bitmap-type inverted indexes. FIG. 5 is a diagram for explaining about the expansion of hashed bitmap-type inverted indexes, and FIG. 6 is a diagram for explaining about the AND operation of the hashed bitmap-type inverted indexes. Herein, as an example, the explanation is given for the operation of restoring the bitmap 50 based on the bitmaps 50a and 50b. The bitmaps 50, 50a, and 50b are same as explained earlier with reference to FIG. 3.

As illustrated in FIG. 5, the restoring unit 22 generates a bitmap 51a based on the bitmap 50a corresponding to the base 29. The information about the flags of the offset "0" to the offset "28" in the bitmap 51a is identical to the information about the flags of the offset "0" to the offset "28" in the bitmap 50a. Moreover, the flag information of the offset "29" onward in the bitmap 51a represents the repetition of the information about the offset "0" to the offset "28" in the bitmap 50a.

In an identical manner, the restoring unit 22 generates a bitmap 51b based on the bitmap 50b corresponding to the base 31. The information about the flags of the offset "0" to the offset "30" in the bitmap 51b is identical to the information about the flags of the offset "0" to the offset "30" in the bitmap 50b. Moreover, the flag information of the offset "31" onward in the bitmap 51b represents the repetition of the information about the offset "0" to the offset "30" in the bitmap 50b.

Subsequently, as illustrated in FIG. 6, the restoring unit 22 performs the AND operation of the bitmaps 51a and 51b, and generates the bitmap 50. In the example illustrated in FIG. 6, in the offsets "0, 5, 11, 18, 25, 35, and 42"; the flag is set to "1" in the bitmaps 51a and 51b. Hence, in the bitmap 50, the flag of the offsets "0, 5, 11, 18, 25, 35, and 42" becomes equal to "1". This bitmap 50 represents the restored bitmap. The restoring unit 22 repeatedly performs the identical operations with respect to the other bitmaps too; and restores those bitmaps, and generates indexes.

The transposition processing unit 23 is a processing unit that, based on the bitmaps in the bitmap-type inverted indexes, transposes the compression codes of the concerned words in the transpose buffers. Herein, the transposition processing unit 23 secures, in a memory, the transpose buffers that are partitioned in units of three bytes representing the highest byte count of the codes managed in the dynamic dictionary 15, and stores the compression code of a word in the transpose buffers corresponding to the positions of appearance of that word.

Figure 7:
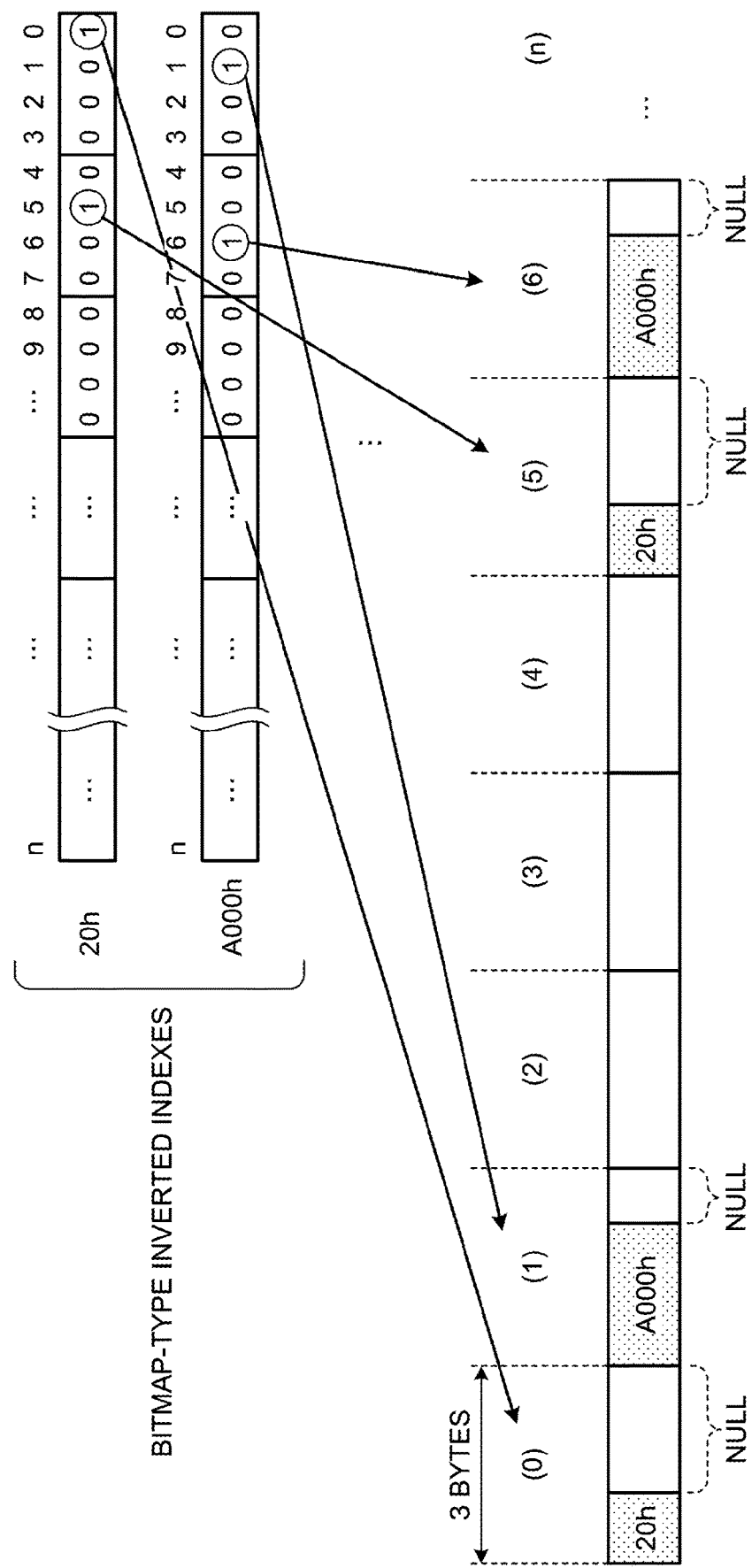
FIG. 7 is a diagram for explaining the transposition of compression codes.

FIG. 7 is a diagram for explaining the transposition of compression codes. As illustrated in FIG. 7, in a compression code "20h", since "1" is stored at the offset (position) "0" and the offset (position) "5", the transposition processing unit 23 stores the compression code "20h" in the initial transpose buffer (0) and the sixth transpose buffer (5). Meanwhile, within the areas in which the compression code "20h" is stored, the unused areas become NULL bytes. In an identical manner, in a compression code "A000h", since "1" is stored in the offset (position) "1" and the offset (position) "6", the transposition processing unit 23 stores the compression code "A000h" in the second transpose buffer (1) and the seventh transpose buffer (6). Meanwhile, within the areas in which the compression code "A000h" is stored, the unused areas become NULL bytes.

In this way, based on the bitmap-type inverted index for each compression code, the transposition processing unit 23 can store, in order from the initial transpose buffer from among the transpose buffers partitioned in units of three bytes, the compression codes of the words according to the sequence of appearance of the words in the document data. Then, the transposition processing unit 23 outputs the transpose buffers, in which the compression codes are stored, to the restoration processing unit 24.

The restoration processing unit 24 is a processing unit that restores the original document data from the transpose buffers in which the compression codes are stored. More particularly, the restoration processing unit 24 deletes the NULL bytes present in the transpose buffers, and generates compressed data in which only the compression codes are extracted. Then, the restoration processing unit 24 performs document data restoration by restoring each compression code to the original word using the static dictionary 14 or the dynamic dictionary 15. Meanwhile, on the other hand, by inserting NULL bytes in the compressed data, the state of the transpose buffers can also be restored.

Figure 8:
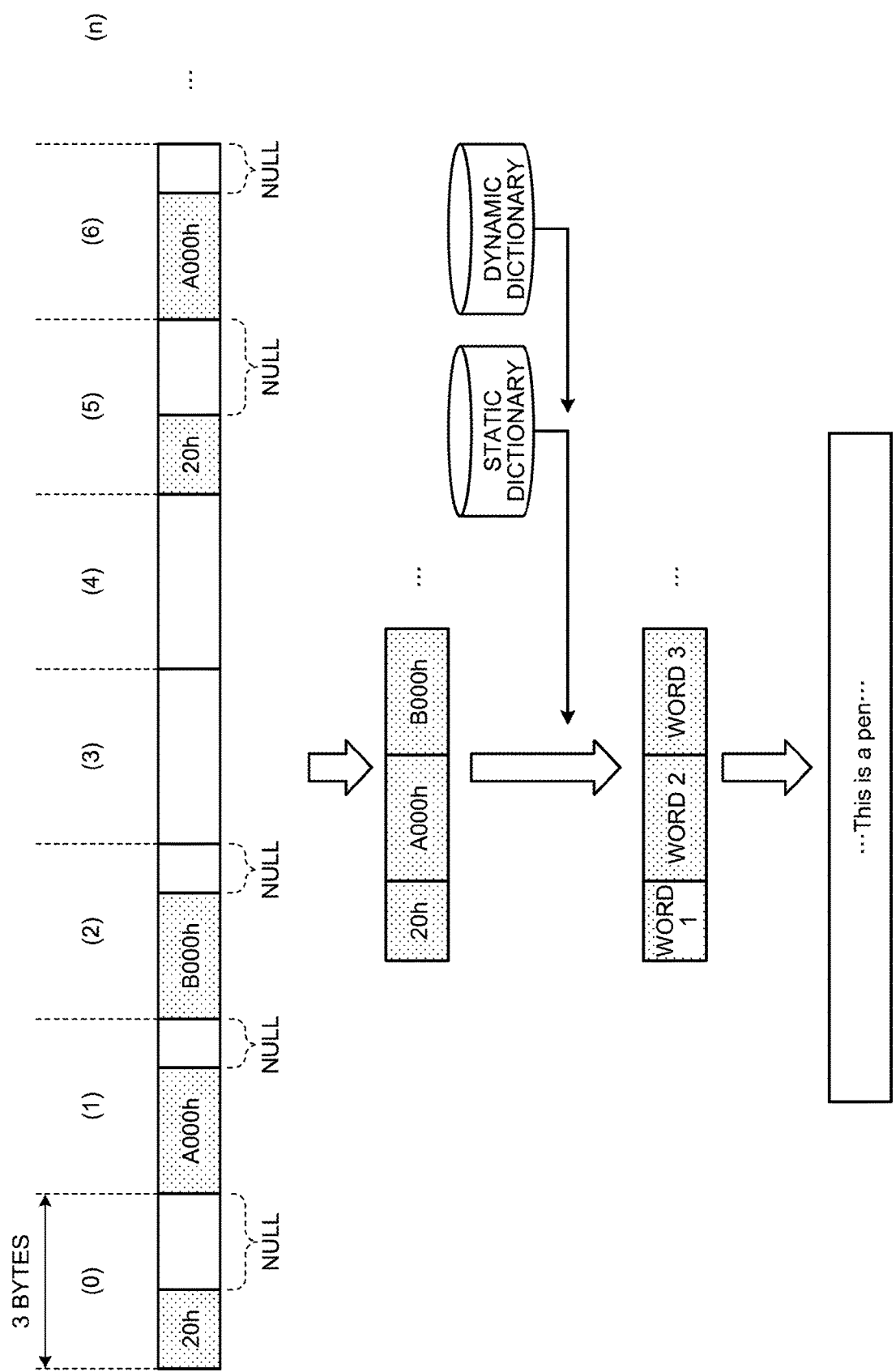
FIG. 8 is a diagram for explaining the generation of compressed data and the restoration of the original document data.

FIG. 8 is a diagram for explaining the generation of compressed data and the restoration of the original document data. As illustrated in FIG. 8, the restoration processing unit 24 sequentially deletes the "NULL" bytes from the initial transpose buffer (0) to the transpose buffer (n), and sequentially extracts compression codes "20h", "A000h", "B000h", and so on. Then, the restoration processing unit 24 concatenates the extracted compression codes and generates compressed data "20h, A000h, B000h, . . . ".

Subsequently, the restoration processing unit 24 refers to the static dictionary 14 and the dynamic dictionary 15; identifies the words corresponding to the compression codes present in the compressed data "20h, A000h, B000h, . . . "; and converts the compressed data into words to generate "word 1, word 2, word 3, . . . ". Then, the restoration processing unit 24 concatenates the word 1, the word 2, the word 3, and so on that are obtained as a result of conversion, and restores the original document data.

Flow of Operations

Figure 9:
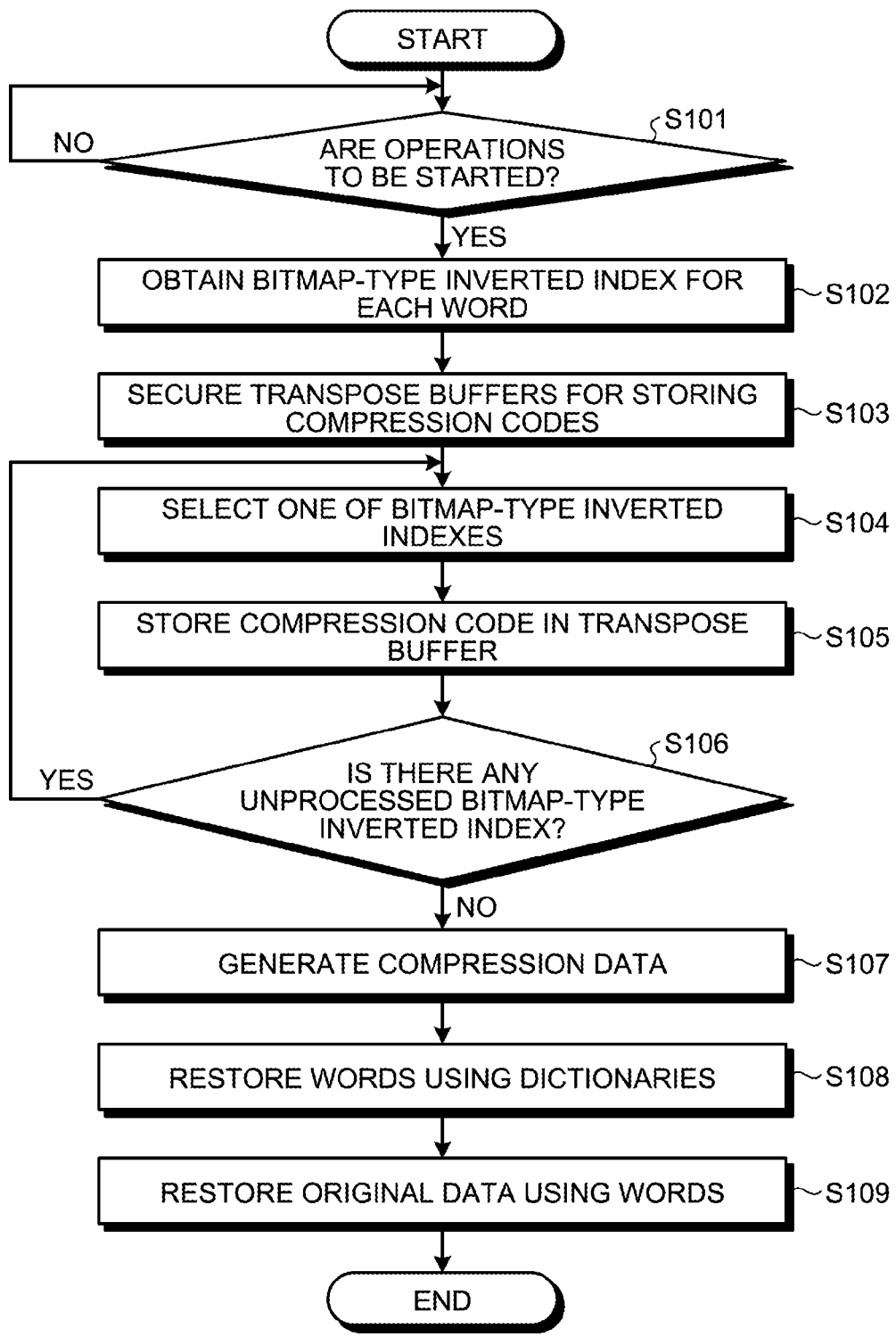
FIG. 9 is a flowchart for explaining a flow of operations.

FIG. 9 is a flowchart for explaining a flow of operations. Herein, it is assumed that the static dictionary and the dynamic dictionary are stored in advance.

As illustrated in FIG. 9, when an instruction for starting the operations is issued (Yes at S101), the obtaining unit 21 of the information processing device 10 obtains the bitmap-type inverted index for each word (S102). If the bitmap-type inverted indexes have been reduced in size as a result of hashing, then the restoring unit 22 restores the bitmap-type inverted indexes to the original size.

Then, the transposition processing unit 23 secures transpose buffers for storing the compression codes (S103). Subsequently, the restoration processing unit 24 selects one of the obtained bitmap-type inverted indexes (S104) and, according to the information stored in the obtained bitmap-type inverted index, stores the compression code in a transpose buffer (S105).

If there is any unprocessed bitmap-type inverted index (Yes at S106), then the system control returns to S104 and the transposition processing unit 23 again performs the subsequent operations. When there is no more unprocessed bitmap-type inverted index (No at S106), the restoration processing unit 24 deletes the NULL bytes present in the transpose buffers and generates compressed data (S107).

Subsequently, the restoration processing unit 24 refers to the dictionaries and restores the compression codes in the compressed data to words (S108), and restores the original document data using the restored words (S109).

Effect

As described above, based on the offset-included bitmap-type inverted indexes, the information processing device 10 transposes and substitutes compression codes and restores the text. More particularly, the information processing device 10 associates the bits of the bit string of an offset-included bitmap-type inverted index with fixed units of three bytes of the bit string of a compression code, and repeatedly transposes the compression codes of all words. Then, the information processing device 10 suppresses the NULL bytes of each compression code. Subsequently, based on the bit strings of the compression codes having fixed units of three bytes, the information processing device 10 restores the text (document data) by referring to a static dictionary and a dynamic dictionary. Thus, based on the offset-included bitmap-type inverted indexes, the information processing device 10 can generate the compression codes and restore the text.

[b] Second Embodiment

Meanwhile, although the present invention has been described with reference to the abovementioned embodiment, it is also possible to implement the invention in various forms other than the abovementioned embodiment. Given below is the explanation of different embodiments.

System

The processing procedures, the control procedures, specific names, various data, and information including parameters described in the embodiment or illustrated in the drawings can be changed as requested unless otherwise specified.

Meanwhile, the constituent elements of the devices illustrated in the drawings are merely conceptual, and need not be physically configured as illustrated. That is, the specific form of separation or integration of the constituent elements is not limited to the configuration illustrated in the drawings. The constituent elements, as a whole or in part, can be separated or integrated either functionally or physically based on various types of loads or use conditions. Moreover, all or some of the processing functions implemented in the processing units can be implemented using a central processing unit (CPU) and using computer programs analyzed and executed by the CPU, or can be implemented using hardware such as a wired logic.

Hardware Configuration

Figure 10:
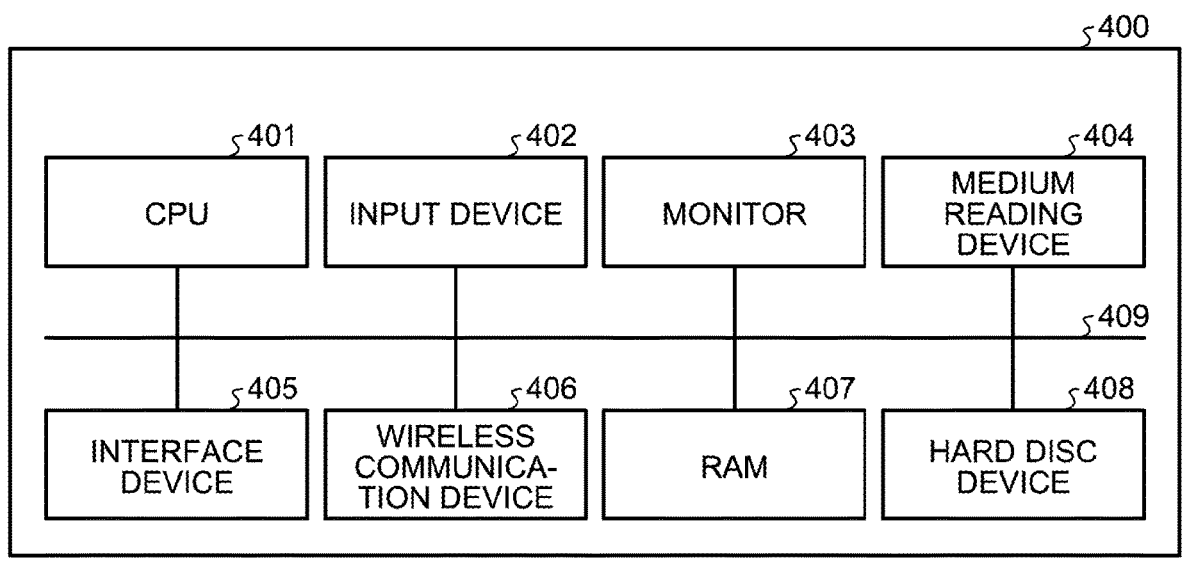
FIG. 10 is a diagram illustrating a hardware configuration of the information processing device according to the first embodiment.

FIG. 10 is a diagram illustrating a hardware configuration of the information processing device 10 according to the first embodiment. As illustrated in the example in FIG. 10, a computer 400 includes a CPU 401 that performs various arithmetic operations; an input device 402 that receives data input from the user; and a monitor 403. Moreover, the computer 400 includes a medium reading device 404 that reads computer programs from memory mediums; an interface device 405 that is used for establishing connection with other devices; and a wireless communication device 406 that is used for establishing wireless connection with other devices. Furthermore, the computer 400 includes a random access memory (RAM) 407 that is used to temporarily store a variety of information; and a hard disc device 408. Moreover, the devices 401 to 408 are connected to each other by a bus 409.

The hard disc device 408 is used to store, for example, an information processing program having identical functions to the functions of the obtaining unit 21 and the restoring unit 22 illustrated in FIG. 2. Moreover, the hard disc device 408 is used to store a variety of data to be used in implementing the information processing program.

The CPU 401 reads various computer programs stored in the hard disc device 408, loads them in the RAM 407, and executes them to perform various operations. The computer programs can be used to make the computer 400 function as, for example, the obtaining unit 21 and the restoring unit 22 illustrated in FIG. 2.

Meanwhile, the information processing program need not always be stored in the hard disc device 408. Alternatively, for example, the computer 400 can read the information processing program stored in a memory medium that is readable by the computer 400, and execute the information processing program. Examples of the memory medium readable by the computer 400 include a portable recording medium such as a compact disc read only memory (CD-ROM), a digital versatile disc (DVD), or a universal serial bus (USB) memory; a semiconductor memory such as a flash memory; and a hard disc drive. Still alternatively, the information processing program can be stored in a device connected to a public line, the Internet, or a local area network (LAN); and the computer 400 can read the information processing program from that device and execute it.

Figure 11:
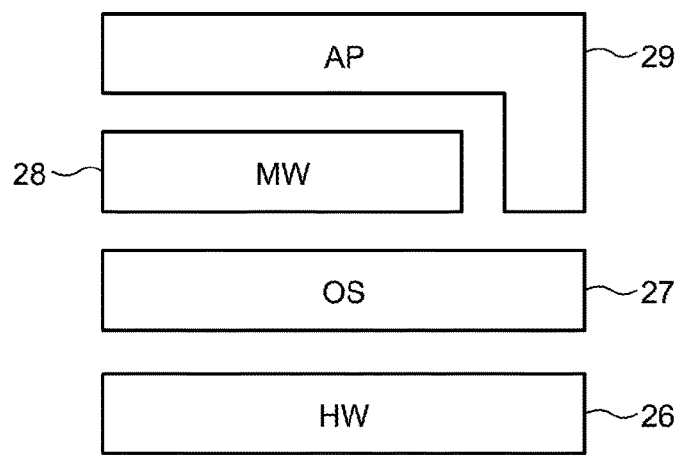
FIG. 11 is a diagram illustrating an exemplary configuration of a computer program running in a computer.

FIG. 11 is a diagram illustrating an exemplary configuration of a computer program running in the computer 400. In the computer 400, an operating system (OS) 27 runs and controls a hardware group 26 (the devices 401 to 409) illustrated in FIG. 10. The CPU 401 operates according to the sequence instructed by the OS 27, and performs control/management of the hardware group 26 so that operations according to an application program 29 or middleware 28 are performed in the hardware group 26. Moreover, in the computer 400, the middleware 28 and the application program 29 are read into the RAM 407 and are executed by the CPU 401.

When a search function is called by the CPU 401, operations are performed based on at least some part of the middleware 28 or the application program 29 (operations are performed based on the OS 27 so as to control the hardware group 26), so that the obtaining unit 21 and the restoring unit 22 are implemented. The functions of the obtaining unit 21 and the restoring unit 22 can be included in the application program 29, or can be a part of the middleware 28 that is called and executed according to the application program 29.

Figure 12:
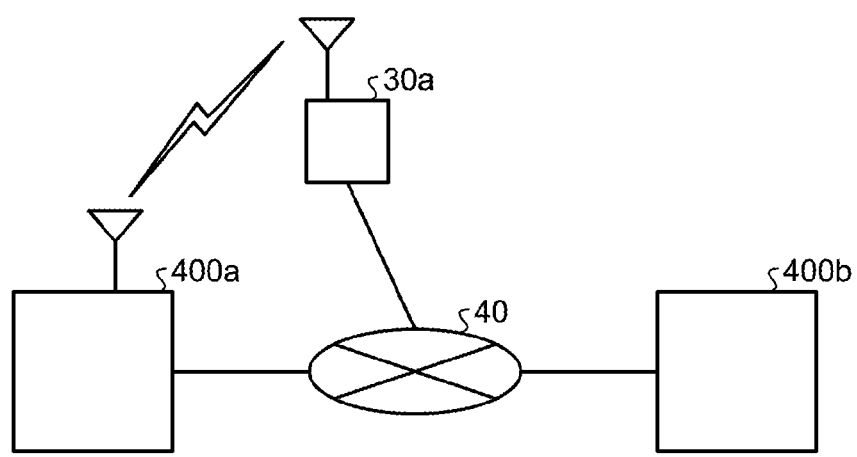
FIG. 12 is a diagram illustrating an exemplary configuration of the devices in a system according to the embodiments.

FIG. 12 is a diagram illustrating an exemplary configuration of the devices in a system according to the embodiments. The system illustrated in FIG. 12 includes computers 400a and 400b, a base station 30a, and a network 40. The computer 400a is connected, at least either in a wired manner or a wireless manner, to the network 40 to which the computer 400b is connected.

According to an aspect of the invention, the original data can be generated using indexes.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a data generation program that causes a computer to execute a process comprising:
   referring to a plurality of indexes that are generated from text data and that associate morphemes in the text data with positions of the morphemes in the text data; and
   causing the morphemes associated by the plurality of indexes to be arranged in a form of a fixed-length string including NULL, in sequence of positions in the text data in order from a top area of a transpose buffer including a plurality of areas partitioned in units of a predetermined byte, deleting the NULL in the transpose buffer to extract only the morphemes, and restoring the text data.

2. The non-transitory computer-readable recording medium according to claim 1, wherein
   in each of the plurality of indexes, a code that is obtained by encoding a morpheme included in the text data is associated to concerned morpheme in the text data, and the codes associated in the plurality of indexes are arranged in sequence of positions in the text data.

3. The non-transitory computer-readable recording medium according to claim 2, wherein, in each of the plurality of indexes, a word having a high frequency of appearance is assigned with a shorter code as compared to a word having a low frequency of appearance.

4. A data generation method comprising:
   referring to a plurality of indexes that are generated from text data and that associate morphemes in the text data with positions of the morphemes in the text data; and
   causing the morphemes associated by the plurality of indexes to be arranged in a form of a fixed-length string including NULL, in sequence of positions in the text data in order from a top area of a transpose buffer including a plurality of areas partitioned in units of a predetermined byte, deleting the NULL in the transpose buffer to extract only the morphemes, and restoring the text data, by a processor.

5. An information processing device comprising:
   a processor configured to:
   refer to a plurality of indexes that are generated from text data and that associate morphemes in the text data with positions of the morphemes in the text data; and
   causing the morphemes associated by the plurality of indexes to be arranged in a form of a fixed-length string including NULL, in sequence of positions in the text data in order from a top area of a transpose buffer including a plurality of areas partitioned in units of a predetermined byte, deleting the NULL in the transpose buffer to extract only the morphemes, and restoring the text data.

* * * * *